US012573156B2

(12) United States Patent
    Naidu et al.

(10) Patent No.: US 12,573,156 B2
(45) Date of Patent: Mar. 10, 2026

(54) SHARED VIRTUAL MAPS USING A VIRTUAL SHARED DATA LAYER

(71) Applicant: Walmart Apollo, LLC, Bentonville, AR (US)

(72) Inventors: Navin Naidu, Dublin, CA (US); Shankara Bhargava, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 141 days.

(21) Appl. No.: 18/417,833

(22) Filed: Jan. 19, 2024

(65) Prior Publication Data

US 2024/0257476 A1      Aug. 1, 2024

Related U.S. Application Data

(60) Provisional application No. 63/442,336, filed on Jan. 31, 2023.

(51) Int. Cl.
    *G06T 19/00*        (2011.01)
    *G06V 10/44*        (2022.01)

(52) U.S. Cl.
    CPC ............ *G06T 19/006* (2013.01); *G06V 10/44* (2022.01)

(58) Field of Classification Search
    CPC .............................. G06T 19/006; G06V 10/44
    See application file for complete search history.

(56) References Cited

U.S. PATENT DOCUMENTS

| | | | | |
|---|---|---|---|---|
| 10,048,077 | B2 * | 8/2018 | Direkwut | ........... G01C 21/3852 |
| 10,395,427 | B1 * | 8/2019 | Côté | ......................... G06T 7/75 |
| 10,768,426 | B2 * | 9/2020 | Ardovino | ............... G06V 20/20 |
| 11,373,376 | B2 * | 6/2022 | Bastov | .................. G06T 19/006 |
| 11,386,623 | B2 * | 7/2022 | Huang | ................ G06F 16/9577 |
| 11,612,817 | B1 * | 3/2023 | McCain | .................. G06F 3/011 |
| | | | | 463/32 |
| 11,738,270 | B2 * | 8/2023 | Iwata | .................... G06F 3/0304 |
| | | | | 365/201 |
| 12,001,644 | B2 * | 6/2024 | Leppänen | ............... G06F 3/013 |
| 12,333,657 | B2 * | 6/2025 | Paulson | .................. G06T 19/00 |

(Continued)

OTHER PUBLICATIONS

A. Yaskevich "Augment Your Sales with Augmented Reality Retail Apps," https://www.scnsoft.com/blog/augmented-reality-in-retail, Oct. 15, 2018, 8 pages.

*Primary Examiner* — Motilewa Good-Johnson

(74) *Attorney, Agent, or Firm* — Jones Day

(57)                ABSTRACT

Systems and methods of generating shared virtual maps include generating interfaces including augmented map data. A request for an interface is received from a local system and base map data including a virtual representation of a physical environment and augmented map data including at least one visible interface element associated with an augmented reality interaction is obtained. The at least one visible interface element is associated with a zone of the virtual representation. An interface including the virtual representation of the physical environment and the at least one visible interface element is generated and provided to the local system. A position of the local system within the physical environment is tracked and the augmented reality interaction is executed when the position of the local system is within the zone associated with the augmented reality interaction.

20 Claims, 8 Drawing Sheets

(56) References Cited

U.S. PATENT DOCUMENTS

| | | | |
|---|---|---|---|
| 12,494,027 B2 * | 12/2025 | Wilczynski | H04N 21/2353 |
| 2011/0145718 A1 * | 6/2011 | Ketola | G06F 3/04815 |
| | | | 715/744 |
| 2012/0013609 A1 * | 1/2012 | Reponen | G06F 3/04815 |
| | | | 345/419 |
| 2014/0002444 A1 * | 1/2014 | Bennett | G06T 19/006 |
| | | | 345/419 |
| 2018/0174195 A1 * | 6/2018 | Agarwal | G06V 20/20 |
| 2019/0236844 A1 * | 8/2019 | Balasian | G06F 3/0304 |
| 2020/0294097 A1 | 9/2020 | Spivack et al. | |
| 2021/0026441 A1 | 1/2021 | Spivack | |
| 2022/0076286 A1 | 3/2022 | Rakshit et al. | |
| 2023/0130770 A1 * | 4/2023 | Miller | G06N 20/00 |
| | | | 345/156 |
| 2023/0362588 A1 * | 11/2023 | Golestanian | H04W 4/33 |
| 2023/0410384 A1 * | 12/2023 | Pajouh | G06T 7/73 |
| 2024/0255285 A1 * | 8/2024 | Naidu | G06Q 30/06443 |
| 2024/0257476 A1 * | 8/2024 | Naidu | G06V 10/44 |

* cited by examiner

2

4

Processor Subsystem

12

6

Input/Output Subsystem

8

Memory Subsystem

10

Communications Interface

100

| Receive Request for Interface | 102 |
|---|---|
| Retrieve Base Map Data | 104 |
| Retrieve Augmented Map Data | 106 |
| Determine Position of Local Device | 108 |
| Generate Interface | 110 |

300

| Provide Interface to Local System | 302 |

| Determine Position of Local System | 304 |

| Generate Augmented Reality Interaction | 306 |

400

SHARED VIRTUAL MAPS USING A VIRTUAL SHARED DATA LAYER

CROSS-REFERENCE TO RELATED APPLICATIONS

This application claims benefit to U.S. Provisional Appl. No. 63/442,336, filed 31 Jan. 2023, entitled Shared Virtual Maps Using a Virtual Shared Data Layer, the disclosure of which is incorporated herein by reference in its entirety.

TECHNICAL FIELD

This application relates generally to augmented mapping systems, and more particularly, to augmented mapping systems using a shared data layer.

BACKGROUND

Navigation of physical environments can be assisted or directed through the use of virtual maps displayed to a user that correspond to a current physical environment. Users can utilize virtual maps to orient or direct themselves within a physical environment. Current systems provide static maps that are maintained and updated by a central authority, such as an owner of the physical environment. Current systems are not enabled to provide shared user-side interaction with virtual maps.

Virtual maps can be displayed to a user through a local system, such as a mobile phone, tablet, or other portable device. Although current virtual maps provide some navigational assistance of a physical environment, current virtual maps are limited to simple information provided by the central authority. Current virtual mapping systems limit user interaction to individual user actions through an interface.

SUMMARY

In various embodiments, a system including a non-transitory memory and a processor communicatively coupled to the non-transitory memory is disclosed. The processor is configured to read a set of instructions to receive a request for an interface from a local system, obtain base map data including a virtual representation of a physical environment, and obtain augmented map data including at least one visible interface element associated with an augmented reality interaction. The at least one visible interface element is associated with a zone of the virtual representation. The processor is further configured to generate an interface including the virtual representation of the physical environment and the at least one visible interface element, provide the interface to the local system, track a position of the local system within the physical environment, and execute the augmented reality interaction when the position of the local system is within the zone associated with the augmented reality interaction.

In various embodiments, a computer-implemented method is disclosed. The method includes receiving a request for an interface from a local system, obtaining base map data including a virtual representation of a physical environment, and obtaining augmented map data including at least one visible interface element associated with an augmented reality interaction. The at least one visible interface element is associated with a zone of the virtual representation. The method further includes the steps of generating an interface including the virtual representation of the physical environment and the at least one visible interface element, providing the interface to the local system, tracking a position of the local system within the physical environment, and executing the augmented reality interaction when the position of the local system is within the zone associated with the augmented reality interaction.

In various embodiments, a computer-implemented method is disclosed. The method includes the steps of receiving a request for a first interface from a first local system, obtaining base map data including a virtual representation of a physical environment, generating the first interface including the virtual representation, providing the first interface to the first local system, receiving a generated augmented interface element from the first local system, receiving a request for a second interface from a second local system, obtaining the base map data including the virtual representation of the physical environment, obtaining augmented map data including the generated augmented interface element, generating the second interface including the virtual representation of the physical environment and the generated augmented interface element, and providing the second interface to the second local system.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
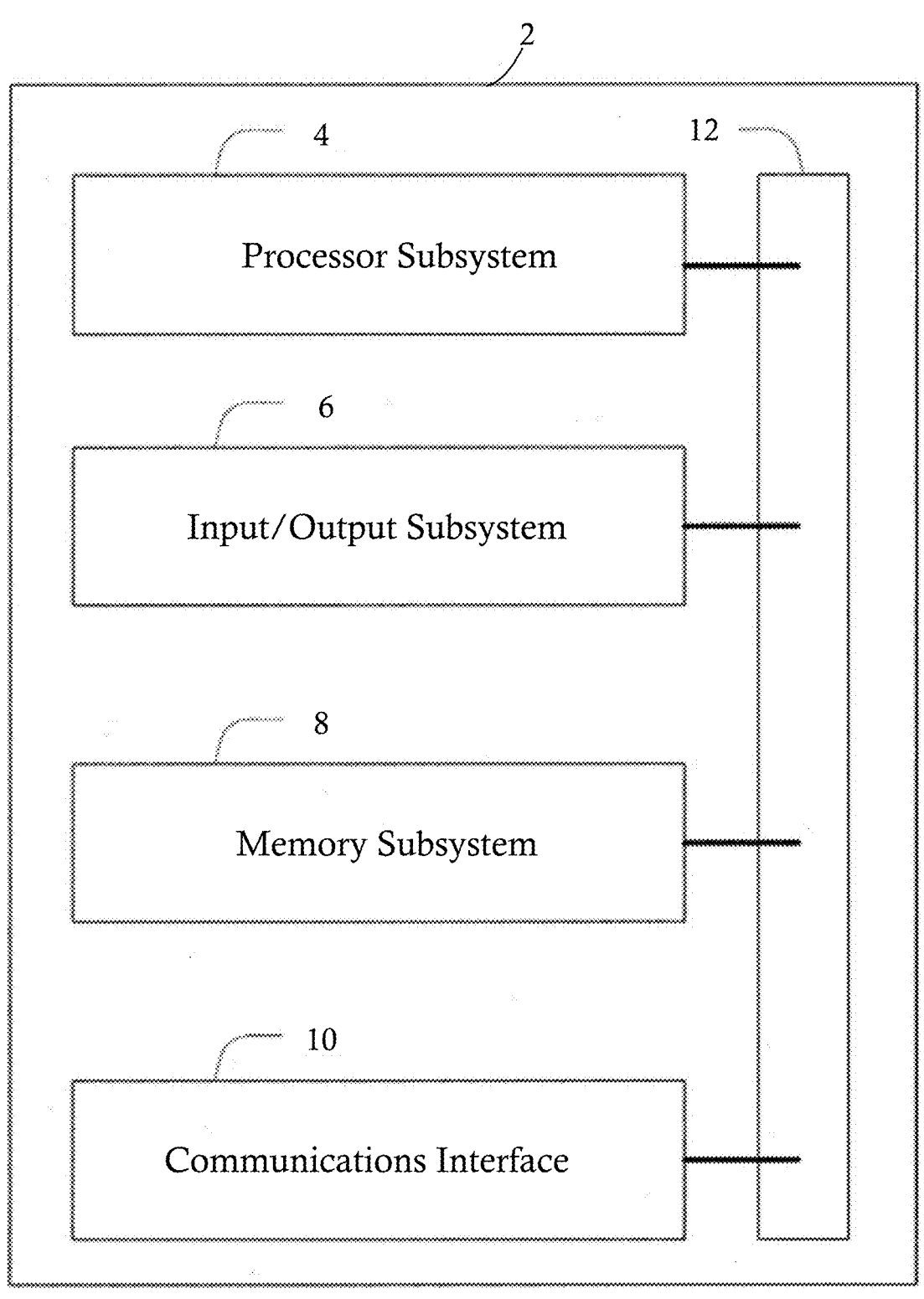
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with"

refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for providing interfaces including shared virtual maps. In various embodiments, an interface is generated including a virtual map of a physical environment, such as a physical store, delineated area, etc. The virtual map can include a two-dimensional or three-dimensional representation of the physical environment as provided by a central authority. The interface is configured to display and allow interaction with a shared data layer including shared interface elements generated by parties other than the central authority. The shared interface elements can include virtual objects, personalized interface elements, augmented reality objects, etc. The shared interface elements can be configured to enable various virtual and/or augmented reality interactions, such as guided or shared journeys within the physical environment, shared virtual notes or elements, shared lists, etc.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for displaying and interacting with shared virtual maps, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
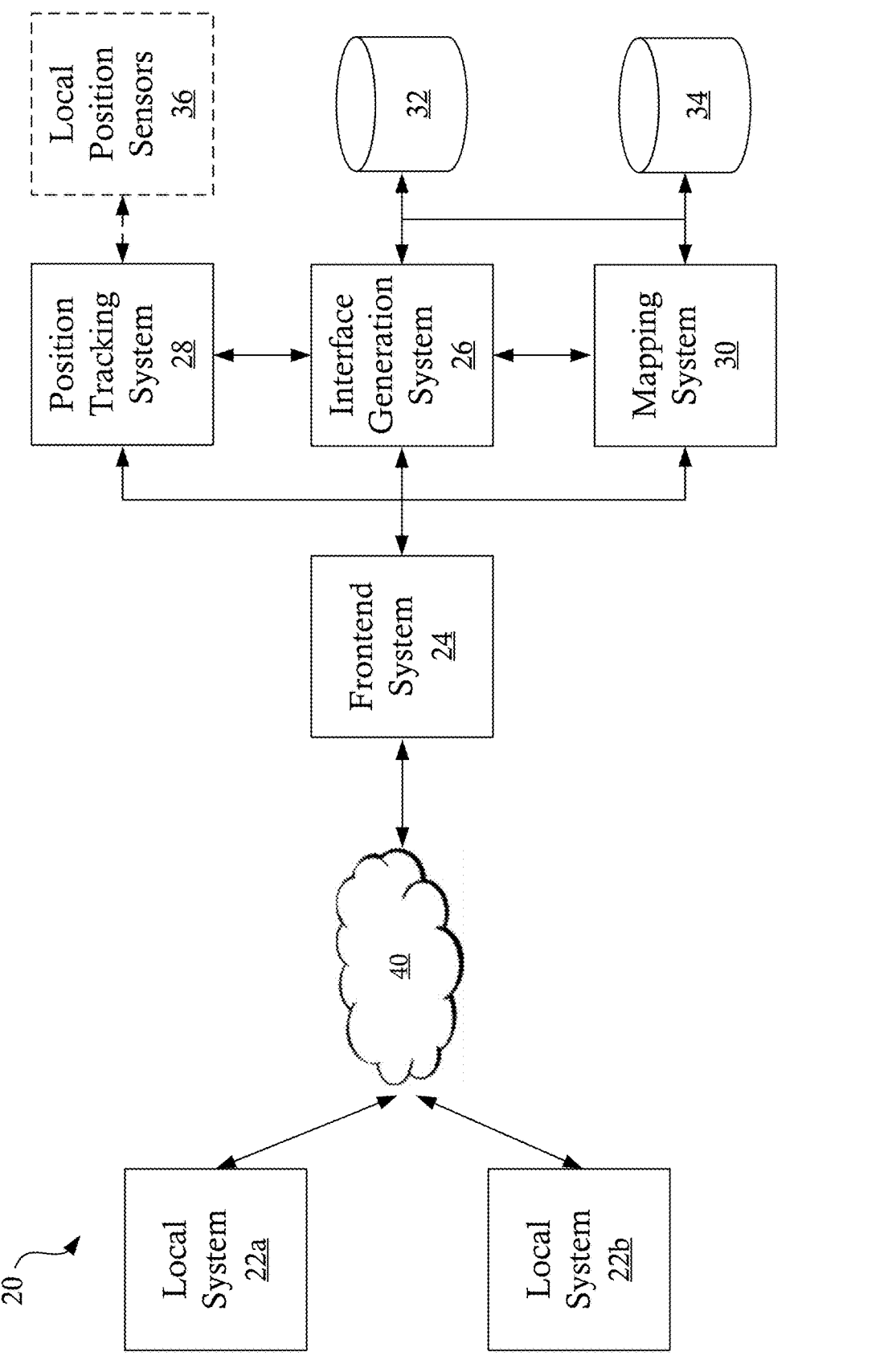
FIG. 2 illustrates a network environment configured to provide an interactive interface including a shared virtual mapping interface, in accordance with some embodiments.

FIG. 2 illustrates a network environment 20 configured to provide an interactive interface including a shared virtual mapping interface, in accordance with some embodiments. The network environment 20 includes a plurality of systems configured to communicate over one or more network channels, illustrated as network cloud 40. For example, in various embodiments, the network environment 20 can include, but is not limited to, local systems 22a, 22b, a frontend system 24, an interface generation system 26, a position tracking system 28, a mapping system 30, an interface database 32, a map database 34, a plurality of local position sensors 36, and/or any other suitable elements. The disclosed systems can include any suitable system, such as a computer system described in conjunction with FIG. 1. Although embodiments are illustrated including discrete systems, it will be appreciated that any of the illustrated systems can be combined into a single system, with or without virtual partitions. It will similarly be appreciated that additional instances of any of the illustrated systems can be included within the network environment 20. Additional systems can be added or incorporated into the network environment 20 to provide additional, alternative, and/or similar operations.

In some embodiments, each of the local systems 22a, 22b are configured to interact with a network interface provided through the frontend system 24. The network interface can include any suitable network interface, such as, for example, a webpage, application interface, development environment, etc. The network interface can be generated by any suitable system, such as an interface generation system 26. The network interface includes a virtual map, such as a visual rendering of a virtual map configured to be displayed via a display of the system.

In some embodiments, the virtual map is generated by a mapping system 30. The mapping system 30 is configured to obtain map data representative of a physical environment and generate a virtual map of the physical environment for inclusion in the generated interface. For example, in some embodiments, map data includes information provided by a central authority, such as an owner and/or operator of the physical environment. The map data can include basic map data, such as a floor plan or other data representative of a layout and permanent fixtures of the physical environment. In some embodiments, the map data is stored in a map database 34.

The network interface includes a shared data layer configured to be positioned over the virtual map. The shared data layer is configured to provide an interactive data layer accessible by entities other than the central authority. For example, in various embodiments, users, third-party content creators, third-part vendors, and/or any other entity can generate and/or position interface elements within the shared data layer. The generated interface elements within the shared data layer can include visible elements (e.g., interface elements visible over portions of the virtual map) and/or an invisible elements (e.g., elements that are present but not visible on the virtual map.

A user can interact with a local system 22a, 22b to generate and add third-party interface elements to the shared data layer. The third-party interface elements can be displayed to users when the users retrieve an interface including the virtual map data from the frontend system 24. The third-party interface elements can be stored in the interface database 32 and retrieved by the interface generation system 28 and/or the mapping system 32 when generating the user interface, as discussed in greater detail below.

In some embodiments, the third-party interface elements are configured to provide an augmented reality experience. For example, a position of a local system 22a, 22b can be tracked by a position tracking system 28. When a local system 22a, 22b is located in an area that corresponds to a third-party interface element included in the virtual map, an interface including an augmented reality experience can be automatically provided to the local system 22a, 22b. For example, a third-party interface element can include an advertisement for a selected item that is to be displayed to users when users are located within a predetermined zone corresponding to a first department of a retail environment. When a local system 22a, 22b is located within the predetermined zone, a predetermined augmented reality experience is generated via the local system 22a, 22b and a generated interface.

In various embodiments, the system or components thereof can comprise or include various modules or engines, each of which is constructed, programmed, configured, or otherwise adapted to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
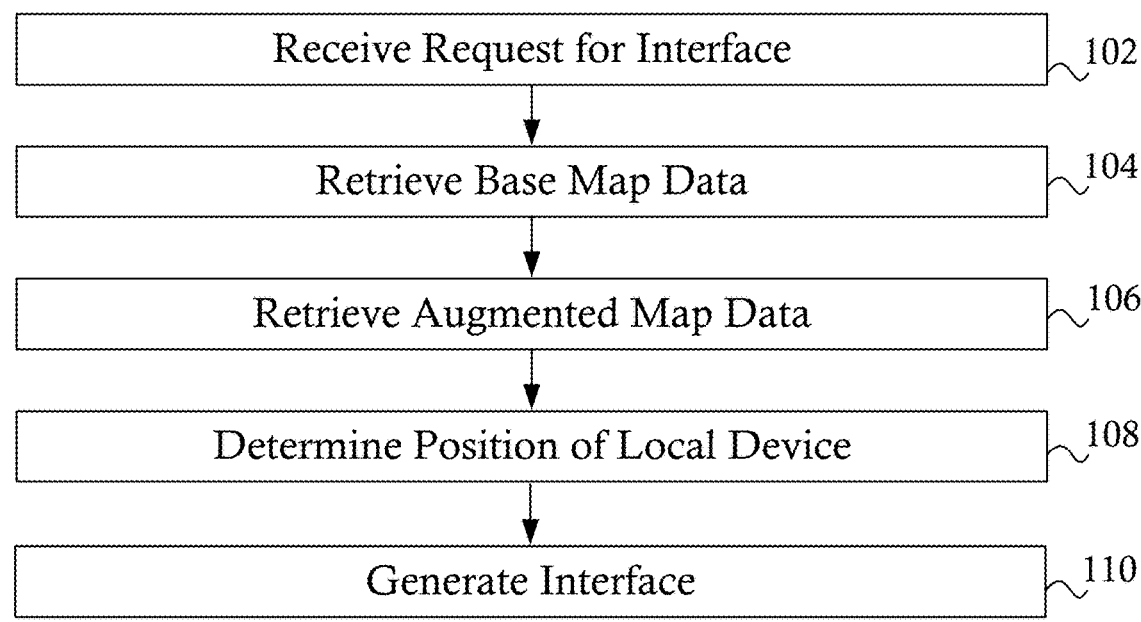
FIG. 3 is a flowchart illustrating a method of providing an augmented reality guidance interface including a shared virtual map, in accordance with some embodiments.
Figure 4:
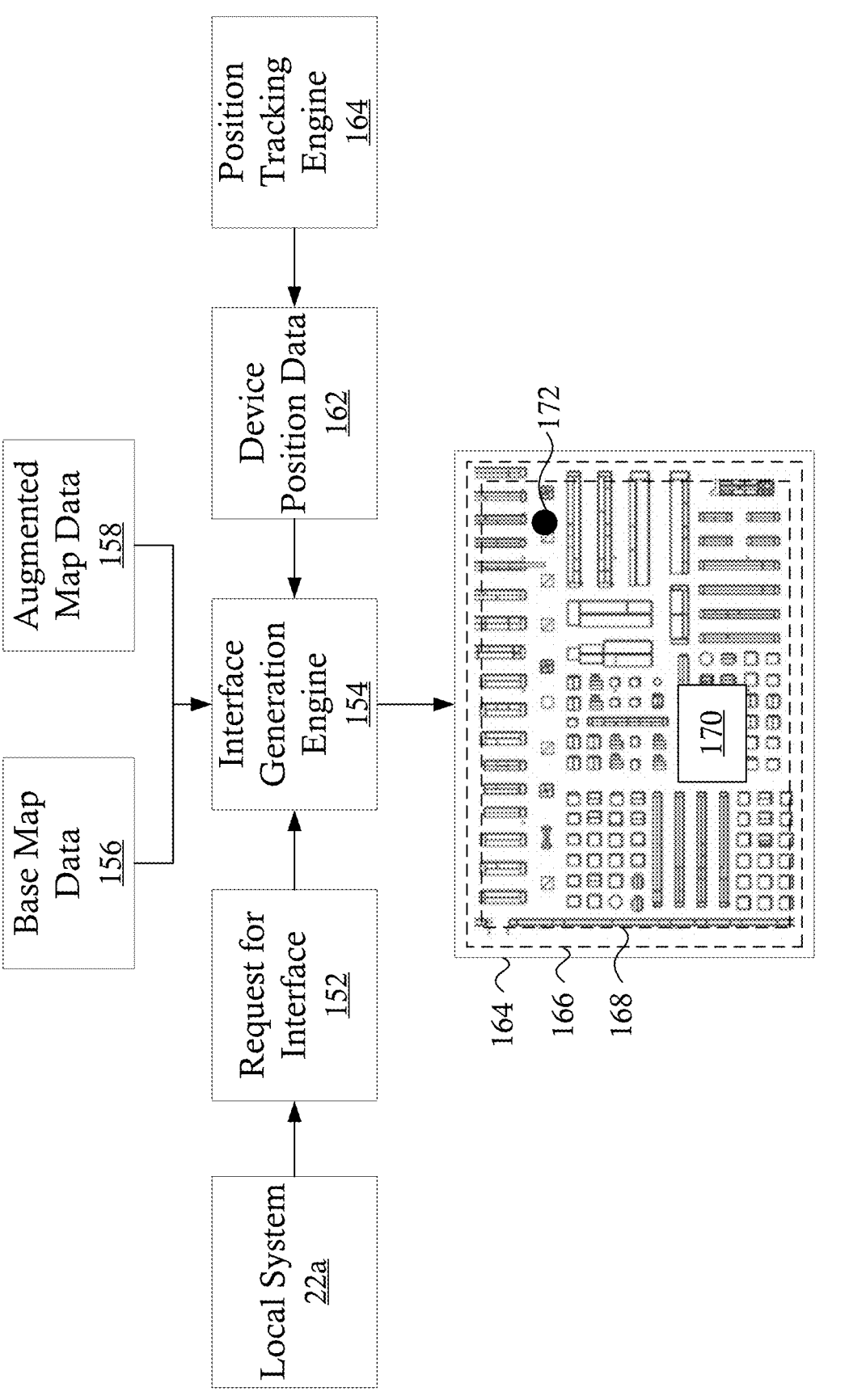
FIG. 4 is a process flow illustrating various steps of the method of providing an augmented reality guidance interface including a shared virtual map, in accordance with some embodiments.

FIG. 3 is a flowchart illustrating a method 100 of providing an augmented reality guidance interface including a shared virtual map, in accordance with some embodiments. FIG. 4 is a process flow 150 illustrating various steps of the method 100 of providing an augmented reality guidance interface including a shared virtual map, in accordance with some embodiments. At step 102, a request 152 for an interface is received from the local system 22a. The request 152 is received by a system, such as a frontend system 26, and provided to an interface generation engine 154. The requested interface can include any suitable interface. For example, the requested interface can include an application interface, a web interface (e.g., website), an augmented reality interface, and/or any other suitable interface.

At step 104, the interface generation engine 154 retrieves base map data 156. The base map data 156 includes map data for a physical environment that provides a base level of information for the physical environment. For example, in some embodiments, the physical environment includes a retail environment, such as a retail store or warehouse. The base map data 156 includes a floor plan or other virtual representation of a layout of the retail environment. The base map data 156 can include information related to a shape, space, permanent installation, and/or other physical attributes of the physical environment. For example, in some embodiments, the base map data 156 provides a virtual representation of a structure containing the physical environment. The base map data 156 can further include information related to semi-permanent and/or temporary fixtures within the physical environment, such as display fixtures (e.g., racks, shelves, etc.), pallets, end caps, and/or any other suitable fixtures. Although embodiments are discussed herein including retail environments, it will be appreciated that any suitable environment can be represented by the base map data 156.

In some embodiments, the base map data 156 is generated by a central authority. The central authority can include an owner/operator of the physical environment represented by the base map data 156 and/or can include a trusted authority for generating base map data 156, such as a mapping service. For example, in embodiments including retail environments, the central authority can include the owner/operator of the retail environment and/or a company hired by the owner/operator of the retail environment to generate base map data 156.

In some embodiments, the base map data 156 includes permanent or semi-permanent interface data. For example, the base map data 156 can include interface elements configured to provide information regarding locations within the virtual representation of the physical environment, such as department identifiers, aisle identifiers, bay identifiers, etc. It will be appreciated that any suitable location information can be displayed in conjunction with the virtual representation of the physical environment. As another example, in some embodiments, the base map data 156 can include permanent or semi-permanent interface elements configured to provide one or more interactions within the physical environment, such as interface elements configured to provide for scanning of items within the physical environment, add-to-cart interactions, check-out interactions, requests for assistance, and/or other operations that are associated with the physical environment and can be performed through one or more interface elements.

In some embodiments, the base map data 156 can include interface elements configured to provide information related to items within the physical environment. For example, the base map data 156 can include interface elements configured to retrieve data related to location or availability (e.g., stock information) of specific items within the physical environment, data related to recommended items or item substitutions (e.g., recommended items based on search history, advertisements, promotions, etc.), and/or any other suitable data. The interface elements can be configured to be integrally displayed with and/or overlayed over the virtual representation of the physical environment within an interface.

In some embodiments, the physical environment represented by the base map data 156 is selected based on location information associated with the device that generated the request 152 for the interface. For example, in some embodiments, a local system 22a generates a request 152 that is received by a frontend system 24. The request 152 can include location data for the local system 22a. For example, the request 152 can include global positioning satellite (GPS) system data, global navigation satellite system (GNSS0 data, network-based position data such as global systems for mobile communications (GSM) localization data, client-side location data such as cell identification and signal strength data, subscriber identify module (SIM)-based position data, Wi-Fi based position data, hybrid positioning system data, and/or any other suitable location data. The position data included in the request 152 can be correlated to a physical environment having base map data 156 stored in a database, such as map database 34.

As another example, in some embodiments, the physical environment includes device and/or location detection systems configured to detect the presence of a local system, such as the first local system 22a, within the physical environment. A request 152 can include a device identifier for the requesting device 22a. The device identifier can be compared to a list of devices detected within one or more physical environments associated with the frontend system 24 and the associated physical environment is selected. Although various embodiments are discussed herein, it will be appreciated that the location of the local system 22a can be associated with the a physical environment using any suitable process.

In some embodiments, the base map data 156 includes one or more zone definitions identifying predetermined zones or delineations within the virtual representation of the physical environment. For example, in some embodiments, zones corresponding to attributes of the physical environment, such as departments, aisles, displays, etc., can be defined within the base map data 156. As another example, in some embodiments, zones corresponding to virtual segmentations of the physical environment, such as interaction zones defined for the virtual representation of the physical environment that do not correspond to physical divisions, can be defined within the base map data 156.

In some embodiments, the interface generation engine 154 is configured to utilize an application programming interface (API) configured to provide access to the base map data 156. For example, in some embodiments, the interface generation engine 154 generates a call or request via the API, such as a REST API, and receives the base map data 156 in response. It will be appreciated that one or more APIs can be configured to provide read access and/or write access (as discussed in greater detail below) for any suitable data discussed herein.

At step 106, the interface generation engine 154 retrieves augmented map data 158. The augmented map data 158 is configured to provide additional interactions, interface elements, and/or otherwise augment the base map data 156. For example, the augmented map data 158 can include data related to time-limited interface elements, interface elements generated by entities other than the central authority, temporary modifications to the visual representation of the base map data 156, etc.

In some embodiments, the augmented map data 158 includes interactive interface elements having a time-limited duration. For example, a content creator, such as the central authority and/or a third-party content creator, can generate a set of interface elements configured to provide an interactive and/or augmented reality experience during a predetermined time period. The interactive interface elements can include any suitable interface elements configured to provide an interactive experience to a user, as discussed in greater detail below with respect to FIG. 5. The interactive interface elements can include, but are not limited to, interface elements related to an augmented reality experience provided at least partially within the physical environment, personalized content campaigns, virtual notes, virtual lists, and/or other interactive interface elements.

At optional step 108, a position of local system, such as a local system 22a, 22b, within the physical environment is determined. In some embodiments, device position data 162 representative of a position of the local system within the physical environment is generated by a position tracking engine 160. The position tracking engine 160 can be implemented by one or more of the local system 22a and/or a position tracking system 30. The device position data 162 can be generated using any suitable process. For example, in some embodiments, the local system 22a generates a unique magnetic signature that can be detected by one or more sensors within the physical environment. One or more parameters of the detected magnetic field can be processed to generate device position data 158 representative of a position of the local system 22a within the physical environment. In some embodiments, one or more sensors 36 are positioned within the physical environment such that a magnetic field of a local system 22a can be detected by one or more of the sensors at any position within the physical environment. In some embodiments, a site magnetic field is generated by one or more elements positioned within the physical environment and the interaction between the site magnetic field and the unique magnetic signature of the local system 22a is detected. Use of magnetic positioning can provide sub-meter accuracy of a position of the local system 22a within the physical environment.

At step 110, an interface 164 is generated and, at step 112, the interface is provided to the local system 22a that generated the initial request 152. The interface 164 includes at least the base map data 156 and the augmented map data 158. For example, in some embodiments, the interface 164 includes a first layer 166 containing the base map data 154 and a second layer 168 containing the augmented map data 158. The second layer 168 can include a transparent layer configured to position interface elements over predetermined portions of the virtual representation of the physical environment provided on the first layer 166. The second layer 168 can include one or more visible elements 170, such as interactive interface elements, and/or invisible elements.

In some embodiments, the interface 164 includes a visual indicator 172 corresponding to a position of the local system 22a within the physical environment, based on the device position data 162. For example, in some embodiments, an icon can be included within the first layer 166, the second layer 168, and/or a third layer (not shown) to indicate a position of the local system 22a on the virtual representation corresponding to a real-world position of the local system

22a within the physical environment. In some embodiments, the visual indicator 172 corresponding to a location of the local system is omitted.

Figure 5:
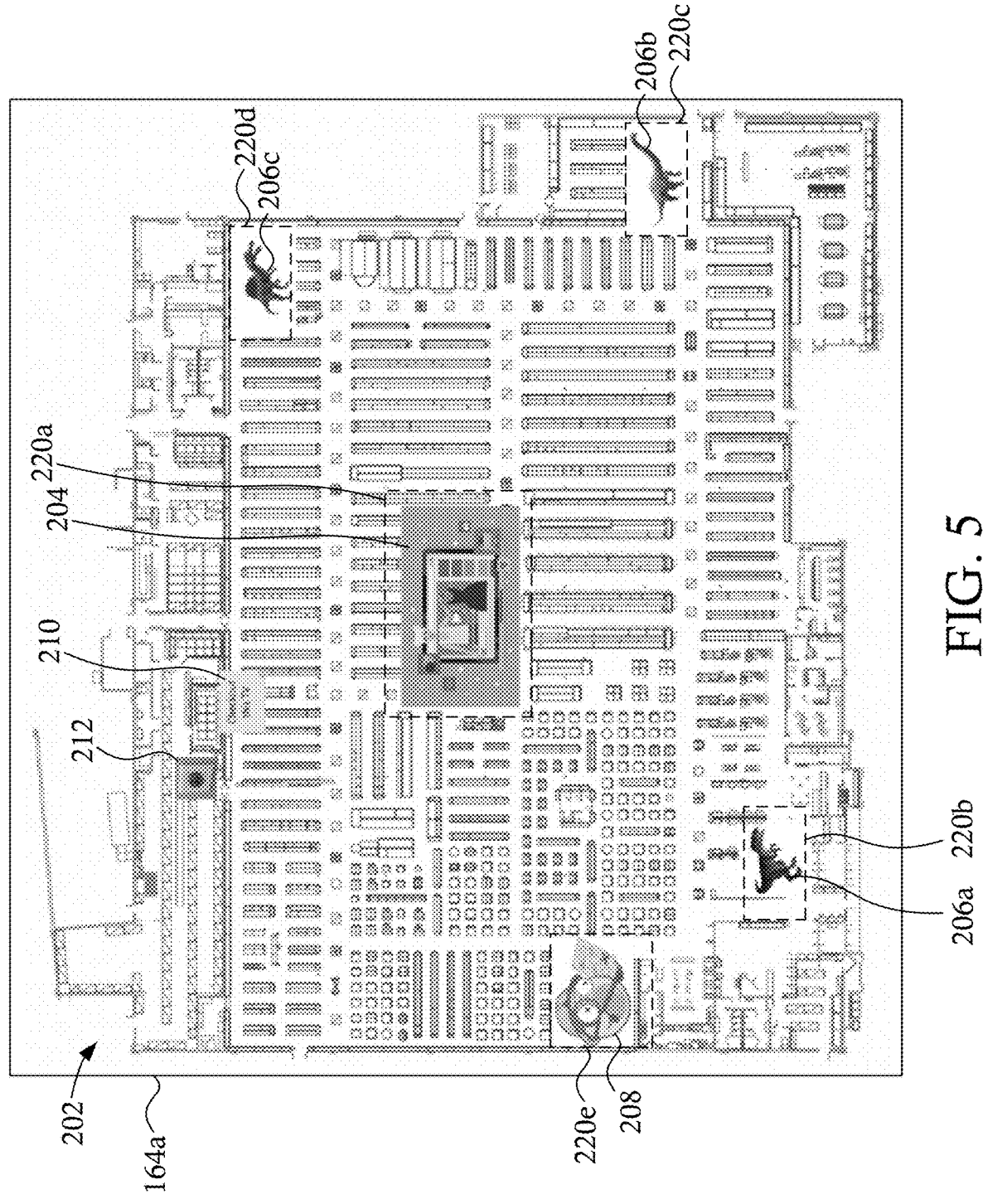
FIG. 5 illustrates an example interface including a virtual map having a plurality of interactive elements, in accordance with some embodiments.

As illustrated in FIG. 5, in some embodiments, an interface 164a includes a first layer 166 having a virtual representation 202 of a retail environment. The virtual representation 202 includes a representations of various permanent, semi-permanent, and/or temporary constructs within the retail environment, such as plurality of fixtures configured to hold and/or display various items available within the retail environment. In some embodiments, the virtual representation 202 can include area designations or delineations using various visual markers, such as, for example, different colors, textures, etc. In the illustrated embodiment, the virtual representation 202 corresponds to the floor plan (or layout) of the physical environment, although it will be appreciated that the virtual representation 202 can include additional elements, such as virtual elements, not present in the physical environment.

A plurality of visible interface elements 204, 206a-206c, 208, 210, 212 (collectively "visible interface elements 204-212") are positioned in a second layer 168 and overlayed over the virtual representation 202 of the physical environment displayed in the first layer 166. The visible interface elements 204-212 can include any suitable interface elements, such as elements related to personalized content, curated shopping journeys, virtual spatial notes, virtual spatial lists, location tagging services, and/or any other suitable visible interface elements.

In some embodiments, an interface 164, 164a is configured to provide navigational assistance to guide a user to various locations within the physical environment associated with augmented reality interactions. For example, in the embodiment illustrated in FIG. 5, a subset of the visible interface elements 204, 206a-206c, 208 represent augmented reality and/or virtual interactions that can executed, at least partially, by a local system 22a when the local system 22a is positioned in an area corresponding to an augmented reality interaction, e.g., an area of a physical environment corresponding to the area of the virtual representation 202 including the associated visible interface element 204, 206a-206c, 208.

In some embodiments, a subset of the visible interface elements 212 are configured to provide guidance to a user to a location within the physical environment related to a physical task or interaction. For example, if a vendor, maintenance worker, or other individual is required to perform physical activities or maintenance within the physical environment, a visible interface element 212 associated with the location of the physical activity can be generated and incorporated into the interface 164a. In the illustrated embodiment, the visible interface element 212 includes an electrical outlet corresponding to the position of an electrical outlet requiring maintenance to guide an electrician or other worker to the outlet during a service operation. Although specific embodiments are discussed herein, it will be appreciated that any suitable interface elements can be generated to guide workers, vendors, and/or other personnel to locations requiring physical operations or interactions.

In some embodiments, a subset of the visible interface elements 210 include user-generated content elements. For example, as discussed in greater detail below, a first user can interact with the generated interface 164, 164a to generate new interface elements while a local system 22a associated with the user is positioned within the physical environment. The first user can generate visible interface elements 210 such as text notes, images, videos, etc. and position the generated interface elements at predetermined locations on the virtual representation 202. When a second user operating a second local system 22b interacts with the interface 164a, the generated visible interface element 210 can be displayed on the virtual representation 202 provided to the second local system 22b, allowing the second user to view the generated visible interface element 210, modify the visible interface element 210, and/or generate additional interface elements.

In some embodiments, the visible interface elements 204-212 include time-limited interface elements. For example, visible interface elements 204, 206a-206c, 208 can include interface elements related to augmented reality interactions that occur during a predetermined time period. Time-limited augmented reality interactions can include, but are not limited to, seasonal promotions, third-party experiences, promotional tie-in experiences, etc. As another example, a generated visible interface element 210, 212 can have a predetermined time-limit after which the generated visible interface element 210, 212 is removed from the augmented map data 158. Predetermined time-limits can be related to service call time periods, preset limits (e.g., one week, one month, etc.), and/or any other suitable time period.

In some embodiments, one or more the visible interface elements 204-212 include user-specific or customized interface elements. For example, a local system 22a can be associated with user account data associated with a user, such as user account data maintained via a log-in mechanism, associated with a unique local system identifier, associated with a beacon or cookie, and/or any other suitable user-specific identification. One or more of the visible interface elements 204-212 can be restricted and displayed only to a predetermined set of users. For example, the visible interface elements 204-212 can be one of a plurality of potential interface elements that can be displayed on a virtual representation 202. When the local system 22a requests an interface 164a, a first interface element associated with the user identifier and/or a user feature or attribute can be loaded and/or provided for inclusion in the requested interface 164a. The first interface element can be selected based on a user identifier, a group associated with a user identifier, and/or any other suitable user-specific identification.

Figure 6:
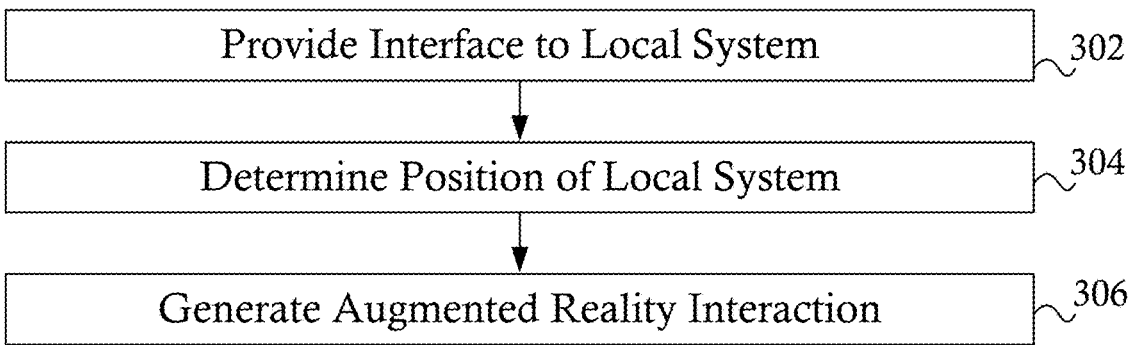
FIG. 6 illustrates a method of activating an augmented reality interaction, in accordance with some embodiments.

FIG. 6 illustrates a method 300 of activating an augmented reality interaction in accordance with some embodiments. At step 302, a user interface, such as interface 164a of FIG. 5, is provided to a local system, such as local system 22a, to facilitate navigation of a physical environment by a user operating the local system 22a. The user interface can be generated according to any suitable process, such as, for example, method 100 discussed above. The interface 164a includes a plurality of visible interface elements 204, 206a-206c, 208 associated with augmented reality interactions.

At step 304, a position of a local system 22a within the physical environment is monitored simultaneous with navigation of the physical environment by the user operating the local system 22a. For example, the position of a the local system 22a can be determined using a position tracking engine 160, as discussed above with respect to step 108 of FIG. 3. When the position of the local system 22a is determined to be within a predetermined area associated with an augmented reality interaction, the method 300 transitions to step 306.

At step 306, an augmented reality interaction is generated at least in part via the local system 22a. For example, in some embodiments, predetermined zones are defined within the physical environment and associated with placement of the visible interface elements 204, 206a-206c, 208 within the virtual representation 202. FIG. 5 includes five zones 220a-220e, shown in phantom. One or more zones 220a-220e can correspond to departments, aisles, bays, and/or other predefined positions or fixtures within the physical environment and/or can be zones 220a-220e defined within the map data 156, 158. It will be appreciated that any suitable number of zones 220a-220e can be defined for a physical environment. In some embodiments, data defining each of the zones 220a-220e and the associated augmented reality interactions, is included in the augmented map data 158.

When the local system 22a is positioned within an area associated with an augmented reality interaction, such as one of the zones 220a-220e, an augmented reality experience is automatically provided, at least partially via the local system 22a. The augmented reality experience can include any suitable interaction, such as a virtual interaction via the local system 22a (e.g., activation of a predetermined video, website, etc.), an augmented interaction via the local system 22a (e.g., an augmented reality image or other interaction with the physical space via the local system 22a), and/or a real-world interaction (such as logging a location of the local system 22a for a scavenger hunt, geotagging, or other location-based interaction). It will be appreciated that any suitable interaction can be activated when the local system 22a is determined to be within a zone 220a-220e associated with an augmented reality interaction.

In some embodiments, the augmented reality interaction can include a user-specific or customized interaction. For example, a local system 22a can be associated with user account data associated with a user, such as user account data maintained via a log-in mechanism, associated with a unique local system identifier, associated with a beacon or cookie, and/or any other suitable user-specific identification. The augmented reality interaction for a specific zone within a physical environment can be one of a plurality of potential interactions associated with various users and/or groups. When the local system 22a is determined to be within an area associated with the plurality of potential interactions, a first interaction associated with the user identifier and/or a user feature or attribute can be loaded and/or provided to the local system 22a for implementation. The first interaction can be selected based on a user identifier, a group associated with a user identifier, and/or any other suitable user-specific identification.

In some embodiments, an augmented reality interaction corresponding to a visible interface element 204 can include an augmented reality interaction related to an attribute of the physical environment. For example, in various embodiments, the augmented reality interaction can include an interaction configured to greet a user via a local system 22a when entering a physical environment and/or portion of a physical environment. As another example, in various embodiments, the augmented reality interaction can include an interaction configured to provide a promotional interaction related to a department or specific item corresponding to a position of the local system 22a within the physical environment. It will be appreciated that any suitable augmented reality interaction related to and/or associated with an attribute of the physical environment can be activated when a local system 22a is positioned within an area associated with an augmented reality interaction.

In some embodiments, augmented reality interactions corresponding to a set of visible interface elements 206a-206c (collectively referred to herein as "visible interface elements 206") can include related augmented reality interactions associated with an interaction program or campaign. For example, in various embodiments, a content creator, such as the central authority and/or a third party content creator, can create a series of augmented reality interactions positioned at various locations within the physical environment. Each of the visible interface elements 206 can be associated with a different, but related interface interaction, such as a series of interactions with augmented reality characters, games, and/or other augmented reality interactions. The interaction program or campaign can include a promotional campaign, an educational program, a third-party campaign, and/or any other suitable program or campaign.

In some embodiments, a visible interface element 208 can correspond to an augmented reality interaction across multiple physical environments. For example, a visible interface element 208 in a first physical environment can provide an augmented reality interaction that is related to augmented reality interactions available at other physical environments, such as other retail or non-retail locations. Such interactions can include, but are not limited to, promotional interactions, scavenger hunts, geotagging interactions, etc. It will be appreciated that visible interaction elements can be related to any suitable augmented reality interactions spread over any number of physical environments.

Figure 7:
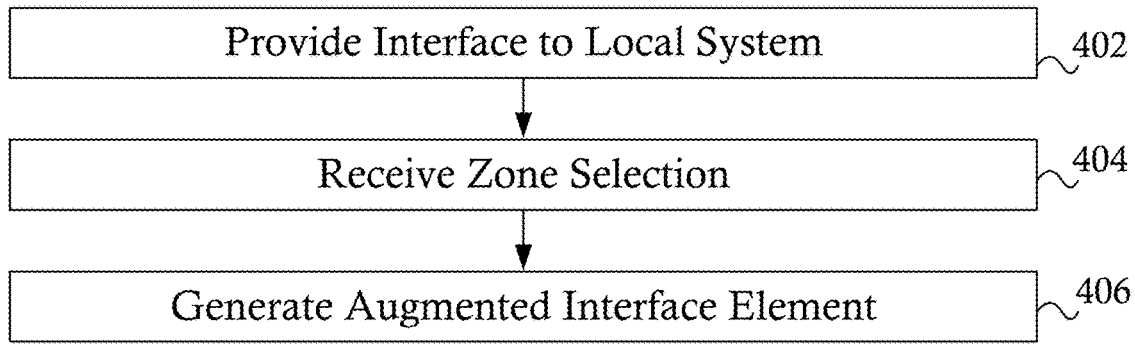
FIG. 7 illustrates a method of generating interface elements for inclusion in augmented map data, in accordance with some embodiments.
Figure 8:
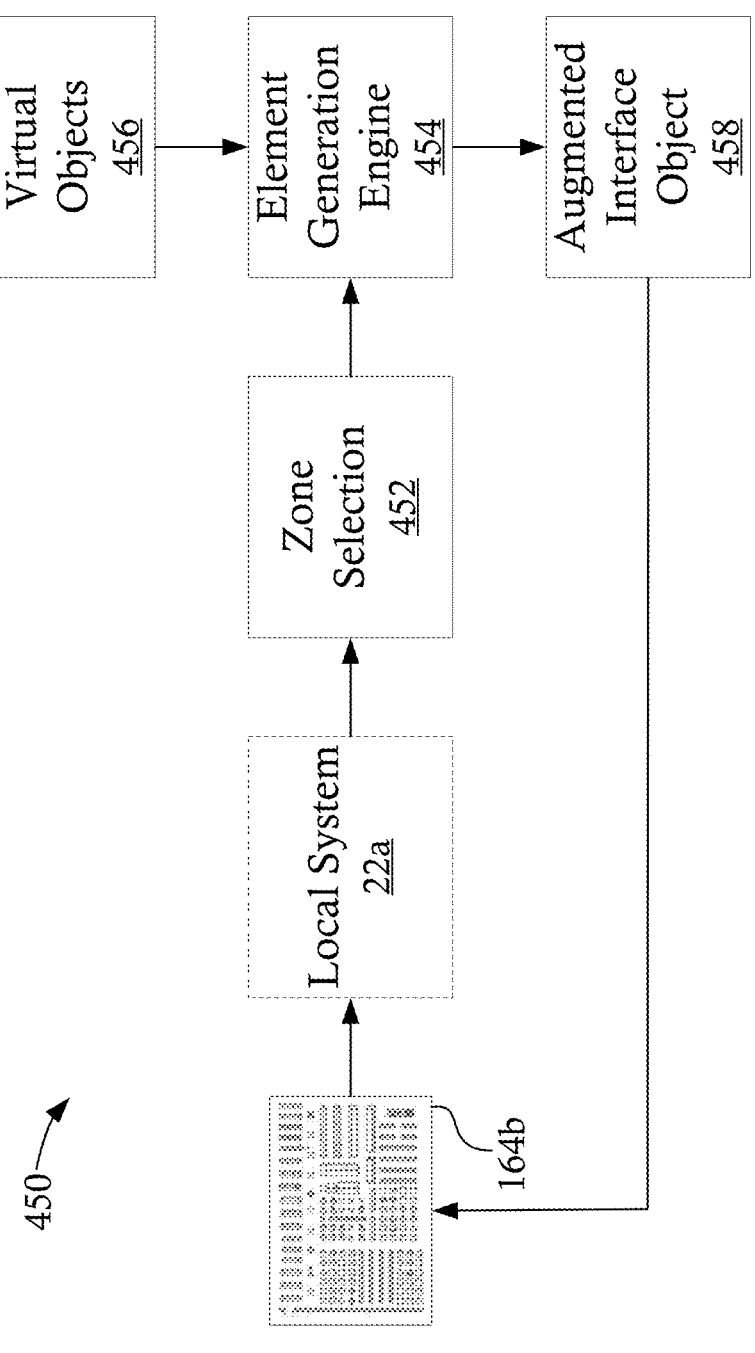
FIG. 8 is a process flow illustrating various steps of the method of generating interface elements for inclusion in augmented map data, in accordance with some embodiments.

FIG. 7 illustrates a method 400 of generating interface elements for inclusion in augmented map data 158, in accordance with some embodiments. FIG. 8 is a process flow 450 illustrating various steps of the method 400 of generating interface elements for inclusion in augmented map data 158, in accordance with some embodiments. At step 402, a user interface 164b is provided to a local system, such as local system 22a. The user interface 164b can be generated according to any suitable process, such as, for example, method 100 discussed above. The user interface 164b includes a visual representation of a physical environment. For example, as shown in FIG. 5, an interface 164a can include a virtual representation 202 of a retail environment.

At step 404, a zone selection 452 is received from the local system 22a. For example, in some embodiments, a user, via the local system 22a, selects a zone or other portion of the displayed visual representation via the user interface 164b and data corresponding to the zone selection is provided to an element generation engine 454. The selected zone 452 can correspond to predetermined zones of the visual representation and/or can be a user defined zone. In some embodiments, the selected zone 452 corresponds to a current location of the local system 22a within the physical environment. In some embodiments, a user can position a local system 22a within a physical environment. When the user operates the local system 22a, a selected zone 452 can be defined based on the current location of the local system 22a within the physical environment. For example, a predetermined zone encompassing the current location of the local system 22a can be identified and/or a new zone encompassing the current location of the local system 22a can be defined. In some embodiments, the selected zone 452 can be a position not associated with the current location of a use device 22a within a physical environment.

At step 406, an augmented interface element 458 is generated and associated with the selected zone 452. The augmented interface element 458 can include any suitable interface element, such as an augmented reality interaction element, a video element, a promotional element, a text element, an image element, a customizable element, a user-specific element, and/or any other suitable interface element. In some embodiments, an interface generation engine 454 is configured to receive one or more inputs from a local system 22a and generate the augmented interface element 458. For example, in various embodiments, the interface generation engine 454 can be configured to receive inputs including an element type definition, an element content definition, a zone identifier, a user identifier, a group identifier, and/or any other suitable data for generating an input element. In some embodiments, the interface generation engine 454 utilizes one or more template interface elements for generating the augmented interface element 458 based on user selections and/or input received from the local system 22a.

In some embodiments, the augmented interface element 458 is generated via one or more interfaces displayed via the local system 22a and configured to interact with an API provided by, for example, the frontend 24. The API can include the same API utilized by the interface generation engine 154, as discussed above in conjunction with FIGS. 3 and 4, and/or can include a separate API. In various embodiments, the API is configured to obtain data for generating an augmented interface element 458, such as templates and/or other default template data, and/or to write generated augmented interface elements 458 to a data store, such as the interface database 34.

In some embodiments, an augmented interface element 458 can be associated with and/or generated for a predetermined domain. For example, domains can include various interaction types, such as customer interactions, vendor interactions, employee interactions, etc. Each generated augmented interface element 458 can be associated with a domain such that the augmented interface element 458 is displayed on interfaces accessing and/or including the associated domain. Domains, and associated augmented interface elements within the domains, can be targeted at a predetermined set of applications, users, locations, etc.

In some embodiments, an augmented interface element 458 is generated form and/or includes a set of virtual objects configured for inclusion in an interface, such as interface 164. The set of virtual objects can include approved and/or pre-generated objects that are suitable for inclusion in an interface 164. The virtual objects can include predetermined objects, customizable objects, and/or user-definable objects. In some embodiments, each of the virtual objects can include both map data, e.g., data related to display of the virtual object on a map and/or an associated augmented reality interaction, and/or additional data unrelated to display of the virtual map, such as links to additional data outside of the interface.

In some embodiments, the augmented interface element 458 includes an augmented reality interaction element configured to trigger an augmented reality interaction, as discussed above with respect to FIG. 6. The augmented reality interaction element can include data for loading, displaying, and/or otherwise generating an augmented reality interaction via the local system 22a. The augmented reality interaction ca be related to a promotional or interactive campaign by the central authority and/or a third party. For example, in some embodiments, a third party can configure one or more augmented reality Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:

a processor; and a non-transitory memory storing instructions that, when executed by the processor, cause the processor to:

receive a request for an interface from a local system;

obtain base map data including a virtual representation of a physical environment, the base map being generated by a central authority;

obtain augmented map data including at least one visible interface element associated with an augmented reality interaction, the at least one visible interface element being associated with a zone of the virtual representation, the augmented map data comprising a shared data layer having shared interface elements generated or modified by entities other than the central authority as part of one or more earlier augmented reality interactions, the at least one visible interface element comprising one or more of the shared interface elements;

generate an interface including the virtual representation of the physical environment and the at least one visible interface element;

provide the interface to the local system;

track a position of the local system within the physical environment; and execute the augmented reality interaction when the position of the local system is within the zone associated with the augmented reality interaction.

2. The system of claim 1, wherein the base map data includes one or more predetermined base interface elements associated with one or more zones of the virtual representation of the physical environment.

3. The system of claim 2, wherein the one or more zones of the virtual representation correspond to one or more features of the physical environment.

4. The system of claim 1, wherein the virtual representation includes a portion of the physical environment, and wherein the portion of the physical environment is determined based on the position of the local system within the physical environment.

5. The system of claim 1, wherein the position of the local system within the physical environment is determined by one or more sensors positioned in the physical environment.

6. The system of claim 5, wherein the one or more sensors include magnetic sensors external to the local system.

7. The system of claim 1, wherein the at least one visible interface element is associated with a time limit for display.

8. A computer-implemented method, comprising:

receiving a request for an interface from a local system;

obtaining base map data including a virtual representation of a physical environment, the base map being generated by a central authority;

obtaining augmented map data including at least one visible interface element associated with an augmented reality interaction, the at least one visible interface element being associated with a zone of the virtual representation, the augmented map data comprising a shared data layer having shared interface elements generated or modified by entities other than the central authority as part of one or more earlier augmented reality interactions, the at least one visible interface element comprising one or more of the shared interface elements;

generating an interface including the virtual representation of the physical environment and the at least one visible interface element;

providing the interface to the local system;

tracking a position of the local system within the physical environment; and executing the augmented reality interaction when the position of the local system is within the zone associated with the augmented reality interaction.

9. The computer-implemented method of claim 8, wherein the base map data includes one or more predetermined base interface elements associated with one or more zones of the virtual representation of the physical environment.

10. The computer-implemented method of claim 9, wherein the one or more zones of the virtual representation correspond to one or more features of the physical environment.

11. The computer-implemented method of claim 8, wherein the virtual representation includes a portion of the physical environment, and wherein the portion of the physical environment is determined based on the position of the local system within the physical environment.

12. The computer-implemented method of claim 8, wherein the position of the local system within the physical environment is determined by one or more sensors positioned in the physical environment.

13. The computer-implemented method of claim 12, wherein the one or more sensors include magnetic sensors external to the local system.

14. The computer-implemented method of claim 8, wherein the at least one visible interface element is associated with a time limit for display.

15. A computer-implemented method, comprising:

receiving a request for a first interface from a first local system;

obtaining base map data including a virtual representation of a physical environment, the base map being generated by a central authority;

generating the first interface including the virtual representation;

providing the first interface to the first local system;

receiving a generated augmented interface element from the first local system;

receiving a request for a second interface from a second local system;

obtaining the base map data including the virtual representation of the physical environment;

obtaining augmented map data including the generated augmented interface element, the augmented map data comprising a shared data layer having shared interface elements generated or modified by entities other than the central authority as part of one or more earlier augmented reality interactions, the generated augmented interface comprising one or more of the shared interface elements;

generating the second interface including the virtual representation of the physical environment and the generated augmented interface element; and providing the second interface to the second local system.

16. The computer-implemented method of claim 15, wherein the base map data includes one or more predetermined base interface elements associated with one or more zones of the virtual representation of the physical environment.

17. The computer-implemented method of claim 16, wherein the one or more zones of the virtual representation correspond to one or more features of the physical environment.

18. The computer-implemented method of claim 15, wherein the virtual representation includes a portion of the physical environment, and wherein the portion of the physical environment is determined based on a position of the second local system within the physical environment.

19. The computer-implemented method of claim 18, wherein the position of the second local system within the physical environment is determined by one or more sensors positioned in the physical environment.

20. The computer-implemented method of claim 19, wherein the one or more sensors include magnetic sensors external to at least one of the first local system and the second local system.

\* \* \* \* \*